Oct. 21, 1969  A. BRAATEN  3,473,314
CABLE WINDING MACHINE WITH FLEXIBLE SENSING UNIT
Filed Dec. 11, 1967
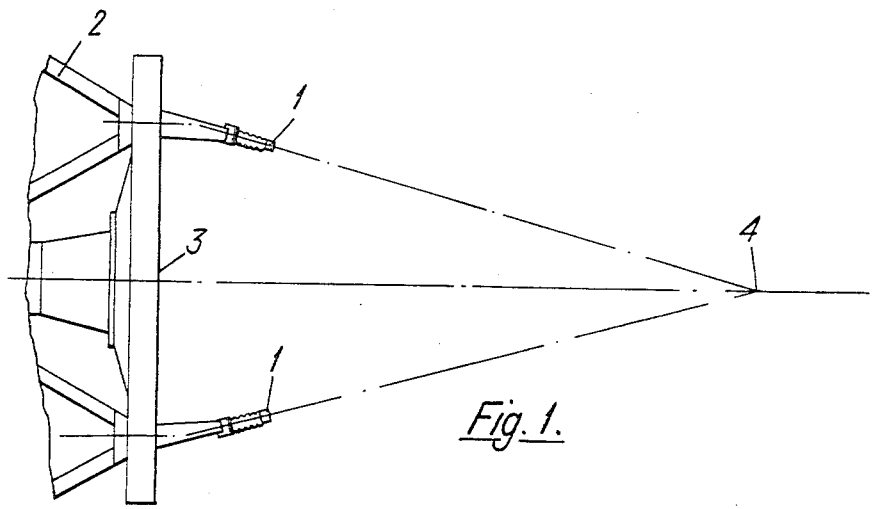
Fig. 1.
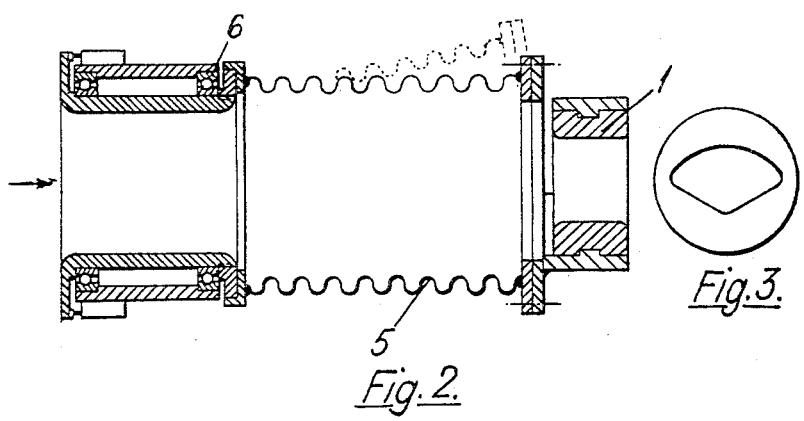
Fig. 2.
Fig. 3.
Inventor
AMUND BRAATEN
By Edward Goldberg
Attorney

3,473,314
CABLE WINDING MACHINE WITH FLEXIBLE SENSING UNIT
Amund Braaten, Oslo, Norway, assignor to International Standard Electric Corporation, New York, N.Y., a corporation of Delaware
Filed Dec. 11, 1967, Ser. No. 689,695
Int. Cl. D01h *13/04, 7/02;* D07b *3/02*
U.S. Cl. 57—106                         3 Claims

ABSTRACT OF THE DISCLOSURE

A machine for winding conductors having sector shaped cores into a cable utilizes a flexibly mounted sensing unit rotated by respective conductors to determine the angular position of each core. The flexible mounting, such as a corrugated tube connecting the sensing unit to the outlet for the conductor from a payoff reel, prevents stress on the core and insulation.

BACKGROUND OF THE INVENTION

Field of the invention

The present invention relates to a cable winding machine for laying up sector shaped conductor cores into a cable. The machine includes a rotatable carriage having cradles for pay-off reels, with the conductors passing through sensing units which detect the angular displacement of the individual sector cores after leaving the cradles in order to obtain a symmetrical position of the cores in multicore cables.

DESCRIPTION OF THE PRIOR ART

Many types of sensing units for detecting the angular displacement of sector cores leaving pay-off reel cradles are known. These sensing units are arranged to be rotated by the respective sector cores, but all present devices are mounted in fixed positions relative to the cores. When large cross-sections are utilized, such fixed mountings may lead to excessive stress on the core insulation so that it may be torn or displaced.

SUMMARY OF THE INVENTION

The object of the present invention is to provide a cable winding machine having sensing units which do not have any undesirable effect on the cores, the machine being especially suitable for pretwisted cables with pretwisted cores.

The main feature of the invention is that the sensing units are flexibly mounted such as on a corrugated tube so that any undesirable effect the sensing unit may have on a core is greatly attentuated. The flexible mounting must be relatively rigid, with the flexibility being active between certain limits. The above mentioned and other features of the present invention will be more apparent from the following description and accompanying drawings.

BRIEF DESCRIPTION OF THE DRAWINGS

FIG. 1 shows a portion of the machine including sensing units,

FIG. 2 is a more detailed view of one sensing unit, and
FIG. 3 shows a cross-section of the unit.

DESCRIPTION OF THE PREFERRED EMBODIMENTS

As shown in FIG. 1, a portion of a cable winding machine includes sensing units 1 mounted at the outlet from respective core reel cradles 2. A carriage 3 rotates the cradles, containing payoff reels of conductors having sector shaped cores, to wind or lay up the cores leaving the reels into a cable at a lay-up point 4. The sensing units detect the angular displacement of each core passing therethrough to provide, by suitable mechanisms, not shown, a symmetrical position of the cores in a multicore cable.

FIGS. 2 and 3 show the sensing unit 1, and sector-shaped cross section thereof, which is preferably mounted on a short length of a flexible corrugated metal tube 5. This tube length 5 is mounted to the outlet from the respective cradle via a ball bearing 6. The sensing unit 1 may be flexibly mounted to the ball bearing in other suitable arrangements which likewise prevent stress on the core and insulation. In operation, an angular rotation of the sector shaped core passing through the similarly shaped opening of the sensing unit 1 causes a corresponding rotation of the unit, which for example may include a cam to actuate suitable switches mounted in each direction of rotation to control a motor which in turn rotates the cradles in the opposite direction to compensate for displacement of the core.

What is claimed is:
1. A cable winding machine for laying up a plurality of conductors having sector shaped cores into a cable comprising a rotating carriage, cradles containing payoff reels of said conductors mounted on said carriage, said cradles being arranged to be rotated about individual axes, and sensing units having sector shaped openings for said cores mounted at the outlet of respective cradle reels for rotation by the angular displacement of the individual sector cores leaving the cradles and passing through said openings, said sensing units being flexibly mounted so that stress by the sensing unit on the core is attenuated.

2. A cable winding machine according to claim 1, wherein each sensing unit is mounted on a tube of flexible corrugated metal, said tube being connected to said outlet, each core passing through a respective tube and sensing unit.

3. The device of claim 2 wherein each said tube is connected to said outlet by a ball bearing.

References Cited

UNITED STATES PATENTS 303,943    8/1884    Morton _____ 57—65

FOREIGN PATENTS 356,376    9/1931    Great Britain.
364,122    1/1932    Great Britain.

DONALD E. WATKINS, Primary Examiner

U.S. Cl. X.R.

57—59